US011368051B2

(12) United States Patent
Lee

(10) Patent No.: US 11,368,051 B2
(45) Date of Patent: Jun. 21, 2022

(54) DISTRIBUTED RECEIVER COILS FOR WIRELESS POWER TRANSFER SYSTEM

(71) Applicant: Toyota Motor Engineering & Manufacturing North America, Inc., Plano, TX (US)

(72) Inventor: Jae Seung Lee, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/778,695

(22) Filed: Jan. 31, 2020

(65) Prior Publication Data
US 2021/0242716 A1 Aug. 5, 2021

(51) Int. Cl.
| H02J 50/10 | (2016.01) |
| H02J 50/90 | (2016.01) |
| H02J 50/40 | (2016.01) |
| B60L 53/126 | (2019.01) |
| H02J 50/80 | (2016.01) |
| B60K 6/28 | (2007.10) |

(52) U.S. Cl.
CPC ............ *H02J 50/10* (2016.02); *B60L 53/126* (2019.02); *H02J 50/40* (2016.02); *H02J 50/80* (2016.02); *H02J 50/90* (2016.02); *B60K 6/28* (2013.01); *B60Y 2200/91* (2013.01); *B60Y 2200/92* (2013.01)

(58) Field of Classification Search
None
See application file for complete search history.

(56) References Cited

U.S. PATENT DOCUMENTS

| 9,533,590 | B2 | 1/2017 | Keeling et al. |
| 10,449,865 | B2 | 10/2019 | Rumbak |
| 2012/0119698 | A1 | 5/2012 | Karalis et al. |
| 2015/0255994 | A1 | 9/2015 | Kesler et al. |
| 2017/0093223 | A1* | 3/2017 | Kai .......................... H02J 50/12 |
| 2017/0288463 | A1* | 10/2017 | Nakahara ................ H02J 50/12 |
| 2018/0339598 | A1* | 11/2018 | Iwamoto ................. B60L 53/38 |
| 2019/0023141 | A1* | 1/2019 | Huang ................. B60L 11/1833 |
| 2019/0084433 | A1 | 3/2019 | Wang et al. |
| 2019/0097471 | A1 | 3/2019 | Pantic et al. |

OTHER PUBLICATIONS

Panchal et al., "Review of static and dynamic wireless electric vehicle charging system," Engineering Science and Technology, an International Journal, vol. 21, Issue 5, pp. 922-937, 2018.

* cited by examiner

*Primary Examiner* — Daniel Kessie
(74) *Attorney, Agent, or Firm* — Christopher G. Darrow; Darrow Mustafa PC

(57) ABSTRACT

System, methods, and other embodiments described herein relate to controlling wireless transfer of power to a vehicle. A method of wirelessly transferring power to a vehicle includes monitoring a power output of a plurality of receiver coils installed on the vehicle, storing power readouts for each coil of the plurality of receiver coils, selecting, based on the power readouts, a first set of receiver coils of the plurality of receiver coils, and forming a connection, via a switch network configured to deliver power to one or more electrical components of the vehicle, between the first set of receiver coils and an electrical component of the vehicle to power the electrical component.

20 Claims, 6 Drawing Sheets

DISTRIBUTED RECEIVER COILS FOR WIRELESS POWER TRANSFER SYSTEM

TECHNICAL FIELD

The subject matter described herein relates, in general, to systems and methods for wireless power transfer in a vehicle, and, more particularly, to controlling distributed receiver coils in a wireless power transfer system.

BACKGROUND

Vehicles that run on electricity fully (e.g., electric vehicles) or partially (e.g., hybrid vehicles) are increasing in development as more manufacturers seek to reduce greenhouse gas emissions and pursue environmentally-friendly transportation alternatives. Generally, electric/hybrid vehicles may be powered by one or more rechargeable batteries that can be charged, for example, by being plugged directly into a power source or by wireless power transfer.

Wireless power transfer refers to transferring energy, e.g., with electric fields, magnetic fields, electromagnetic fields, or otherwise, from a transmitter to a receiver without the use of physical electrical conductors. That is, power may be transferred through free space. Conventional wireless power transfer systems for electric/hybrid vehicles can include 1-3 high power receiver coils (e.g., overlapped "Double D" or "DDQ" coils) located on the underside of the vehicle to receive power from inductance circuits on a power transmitter, which can be embedded in a road or the ground beneath the vehicle. The efficiency of the energy transfer between the transmitter and the vehicle is highly sensitive to the alignment of the respective transmit/receive coils.

Furthermore, autonomous vehicles and driver-assist systems in vehicles are increasingly being developed and implemented in electric or hybrid vehicles. However, conventional vehicles that have autonomous and electric/hybrid capabilities tend to rely on rechargeable batteries and are not well-equipped to navigate in a manner that supports efficient energy transfer in wireless power transfer systems.

SUMMARY

The disclosed systems and methods relate to improving wireless power transfer operations in a vehicle, particularly an electric or hybrid vehicle, and more particularly an electric/hybrid autonomous vehicle or a vehicle that includes autonomous or semi-autonomous features.

In one embodiment, a vehicle includes a wireless power transfer system, comprising a switch network configured to deliver power to one or more electrical components of the vehicle, a plurality of receiver coils, distributed on an underside of the vehicle, configured to receive power wirelessly and connected to the switch network, one or more processors and a memory communicably coupled to the one or more processors and storing a monitoring module including instructions that when executed by the one or more processors cause the one or more processors to monitor the plurality of receiver coils and output power readings for each coil of the plurality of receiver coils and a controller module including instructions that when executed by the one or more processors cause the one or more processors to select, based on the power readings, a first set of receiver coils of the plurality of receiver coils and form a connection, via the switch network, between the first set of receiver coils and an electrical component of the vehicle to power the electrical component.

In another embodiment, a method of wirelessly transferring power to a vehicle includes monitoring a power output of a plurality of receiver coils installed on the vehicle, storing power readings for each coil of the plurality of receiver coils, selecting, based on the power readings, a first set of receiver coils of the plurality of receiver coils, and forming a connection, via a switch network configured to deliver power to one or more electrical components of the vehicle, between the first set of receiver coils and an electrical component of the vehicle to power the electrical component.

In another embodiment, a non-transitory computer-readable medium for wirelessly transferring power to a vehicle including instructions that, when executed by one or more processors, cause the one or more processors to monitor a power output of a plurality of receiver coils installed on the vehicle, store power readings for each coil of the plurality of receiver coils, select, based on the power readings, a first set of receiver coils of the plurality of receiver coils, and form a connection, via a switch network configured to deliver power to one or more electrical components of the vehicle, between the first set of receiver coils and an electrical component of the vehicle to power the electrical component.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with improving wireless power transfer efficiency in a vehicle are disclosed. As mentioned previously, a hybrid/electric vehicle may be equipped with one or more main receiver coils which may be located at fixed areas on the vehicle, for example, on an underside of the vehicle. Such configurations may be carry relatively strict alignment requirements to achieve usable energy transfer. The disclosed embodiments can reduce stringent alignment requirements that are applicable to conventional wireless power transfer systems by deploying multiple receiver coils (e.g., solenoid-type coils) distributed on the underside of the vehicle to increase a total coupling area and increase flexibility of the system to respond to different scenarios, such as malfunction or alignment drift.

The disclosed embodiments can include receiver coils that can be generally smaller than the main receiver coil(s), or in some embodiments, can completely replace the main receiver coil(s). The disclosed receiver coils are connected to a switch network and are managed by a central system controller to direct received energy to various electrical components of the vehicle. For example, the energy from the disclosed receiver coils can be directed to a main battery of the vehicle, to one or more auxiliary batteries for supplying power locally to other devices, or directly to subsystems of the vehicle, e.g., sensors, backup cameras, etc., that require power.

Conventional high-power wireless power transfer systems may require positioning/piloting sensors to assist in aligning the transmit/receive coils for optimum energy transfer. However, the disclosed embodiments can deploy two or more disclosed receiver coils near opposite sides of the vehicle as part of the distributed receiver coil arrangement and analyze the difference in the received voltage levels from the opposite sides to determine a lateral alignment position of the vehicle with respect to a power transmitting device beneath the vehicle. In one or more embodiments, the alignment information can be used to determine an optimal lateral position for the distributed receiver coils, for an existing high-power wireless power transfer system of the vehicle, or for the entire wireless power transfer system including the high-power component and the distributed receiver coils.

The disclosed embodiments are therefore more flexible and can provide a more robust response to malfunction compared to conventional high-power wireless power transfer systems. For example, the disclosed distributed receiver coil system can continue to function even if one or more receiver coils malfunction. Moreover, in implementations that include redundant receiver coils, the switch network can be dynamically adjusted to reroute power from a redundant receiver coil to replace power loss from a malfunctioning receiver coil.

Figure 1:
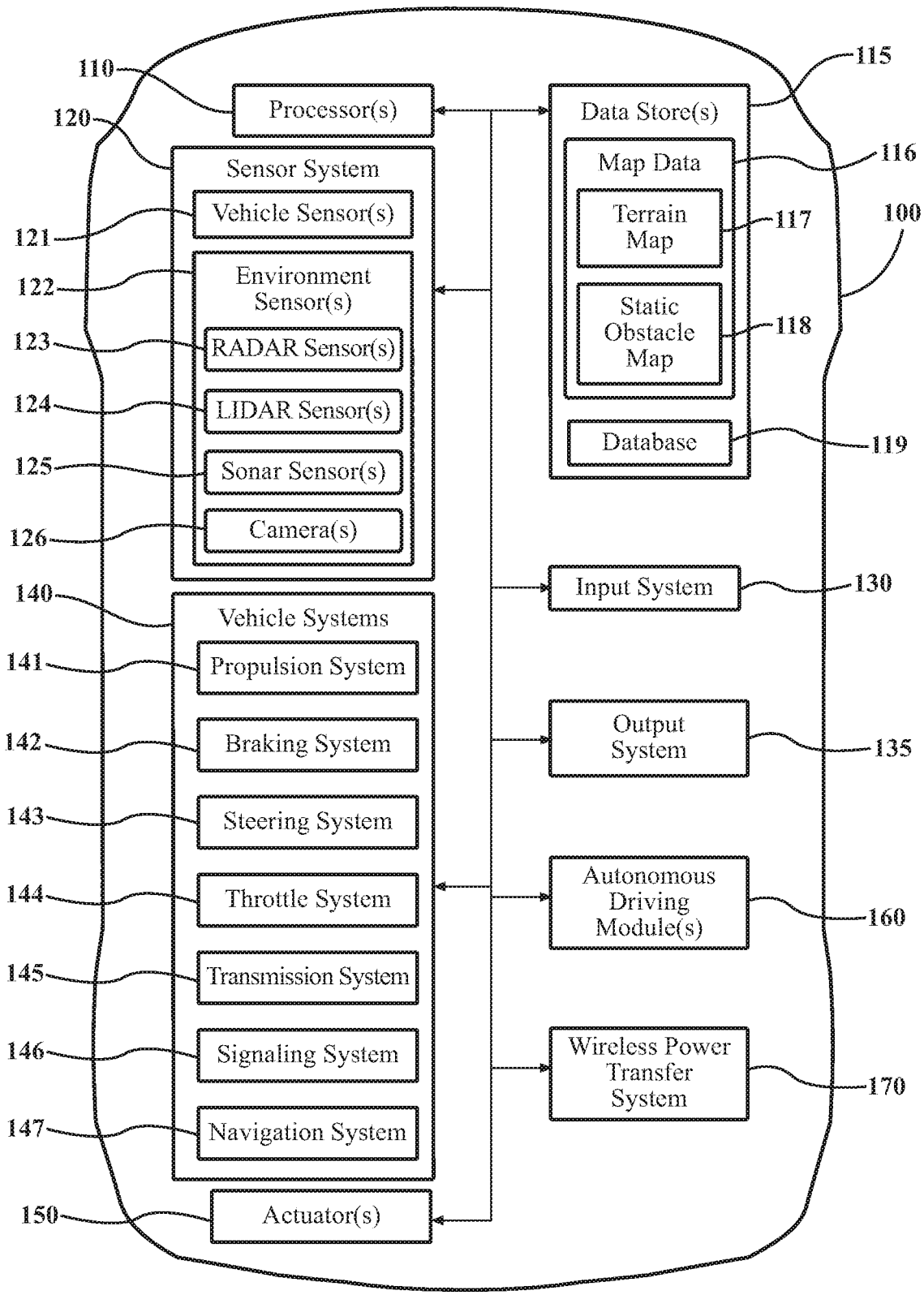
FIG. 1 illustrates one embodiment of a vehicle within which systems and methods disclosed herein may be implemented.

Referring to FIG. 1, an example of a vehicle 100 is illustrated. As used herein, a "vehicle" is any form of powered transport. In one or more implementations, the vehicle 100 is an automobile, e.g., a hybrid/electric automobile, an autonomous/semi-autonomous automobile, a combination thereof, etc. While arrangements will be described herein with respect to automobiles, it will be understood that embodiments are not limited to automobiles. In some implementations, the vehicle 100 may be any robotic device or form of powered transport that, for example, is equipped with a wireless power transfer system, and thus can benefit from the functionality discussed herein.

As shown in FIG. 1, the vehicle 100 includes multiple elements. It should be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a more detailed description of many of the elements in FIG. 1 will be provided after the discussion of FIGS. 2-6 for purposes of brevity in this description. It will be appreciated that for simplicity and clarity of illustration, where appropriate, reference numerals have been repeated among the different figures to indicate corresponding or analogous elements. In addition, while the discussion outlines numerous specific details to provide a thorough understanding of the embodiments described herein, those of skill in the art, will understand that the embodiments described herein may be practiced using various combinations of these elements.

In any case, the vehicle 100 includes a wireless power transfer system 170 that is implemented to perform methods and other functions as disclosed herein relating to wirelessly receiving power and directing the received power to various electrical components of the vehicle 100. The noted functions and methods will become more apparent in the following discussion of the figures.

Figure 2:
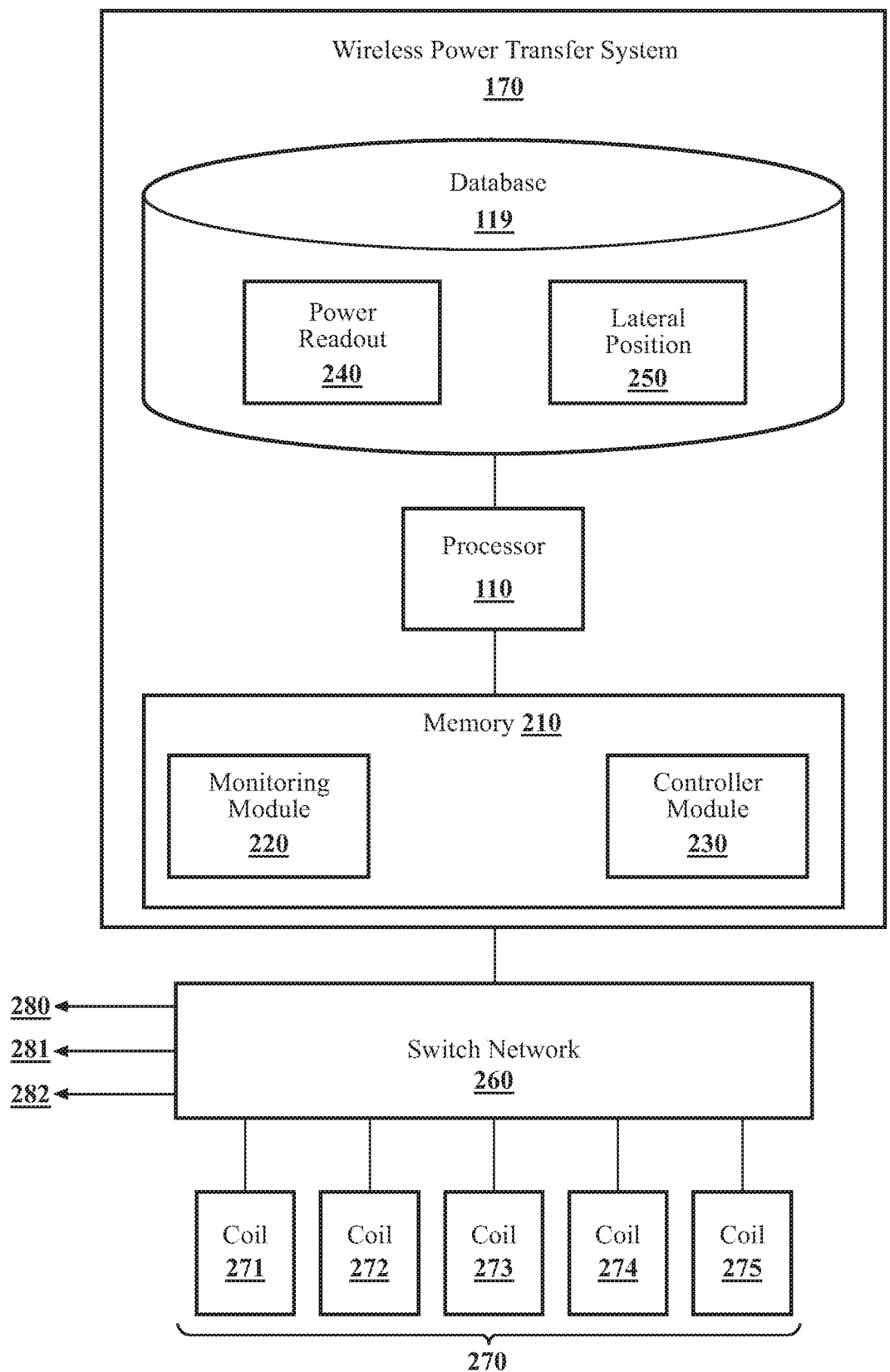
FIG. 2 illustrates one embodiment of a wireless power transfer system according to the disclosed embodiments.

With reference to FIG. 2, one embodiment of the wireless power transfer system 170 of FIG. 1 is illustrated. The wireless power transfer system 170 is shown as including a processor 110 and database 119 from the vehicle 100 of FIG. 1. Accordingly, the processor 110 may be a part of the wireless power transfer system 170, the wireless power transfer system 170 may include a separate processor from the processor 110 of the vehicle 100 or the wireless power transfer system 170 may access the processor 110 through a data bus or another communication path.

In one embodiment, the wireless power transfer system 170 is operably connected with a switch network 260 that is electrically connected to a plurality of receiver coils 270 configured to wirelessly receive power from a power transmission device, such as transmission coils. Although five individual receiver coils 271-275 are illustrated, this is merely an example for illustrative purposes. An implementation of the disclosed subject matter can include a number of individual receiver coils greater than or less than the example number of receiver coils 270 shown in the figure. As will be discussed further below, the wireless power transfer system 170 can alter a configuration of the switch network 260 to selectively transfer power from one or more of the receiver coils 270 to one or more specific electrical components or subsystems of the vehicle 100 via one or more outputs 280-282. For example, the wireless power transfer system 170 can set the configuration of the switch network 260 to transfer power from a first set of receiver coils (e.g., 271-272) through a first output (e.g., 280) to power a first component (e.g., a rear view camera), and transfer power from a second set of receiver coils (e.g., 272-273) through a second output (e.g., 281) to power a second component (e.g., a proximity sensor).

The wireless power transfer system 170 includes a database 119 that stores, among other things, power readout information 240 (e.g., power level readouts from the receiver coils 270) and lateral position information 250, as will be discussed further below. The database 119, in one embodiment, is constructed as an electronic data structure stored in the memory 210 or another data store, such as the vehicle 100 data store 115, a cloud-based storage, a removable memory device, or another suitable location that is accessible to the modules 220 and 230. The database 119 is configured with routines that can be executed by the processor 110 for analyzing stored data, providing stored data, organizing stored data, and so on. Thus, in one embodiment, the database 119 stores data described above (as well as other data) used by the modules 220 and 230 in executing various functions.

Additionally, the wireless power transfer system 170, in one embodiment, includes a memory 210 that stores a monitoring module 220 and a controller module 230. The memory 210 can be constructed as a random-access memory (RAM), read-only memory (ROM), a hard-disk drive, a flash memory, or other suitable memory for storing the modules 220 and 230. The modules 220 and 230 are, for example, constructed as computer-readable instructions that when executed by the processor 110 cause the processor 110 to perform the various functions disclosed herein.

The monitoring module 220 is generally constructed including instructions that function to control the processor 110 to monitor the coils 270 and output a power readout for each individual coil. The monitoring module 220 can store the power readouts 240 in the database 119. In one or more embodiments monitoring module 220 can monitor the coils 270 on an ongoing basis and update the power readouts 240 in real time. In one or more embodiments the monitoring module 220 can monitor the coils 270 on a periodic basis and update the power readouts 240 at set time intervals, e.g., once every minute, fifteen minutes, or hour, etc.

The controller module 230 is constructed including instructions that function to control the processor 110 to select, based on the power readouts 240, a first set of coils of the plurality of coils 270 and form a connection, via the switch network 260, between the set of coils and an output connected to an electrical component or subsystem of the vehicle 100 to power the electrical component or subsystem.

Figure 3:
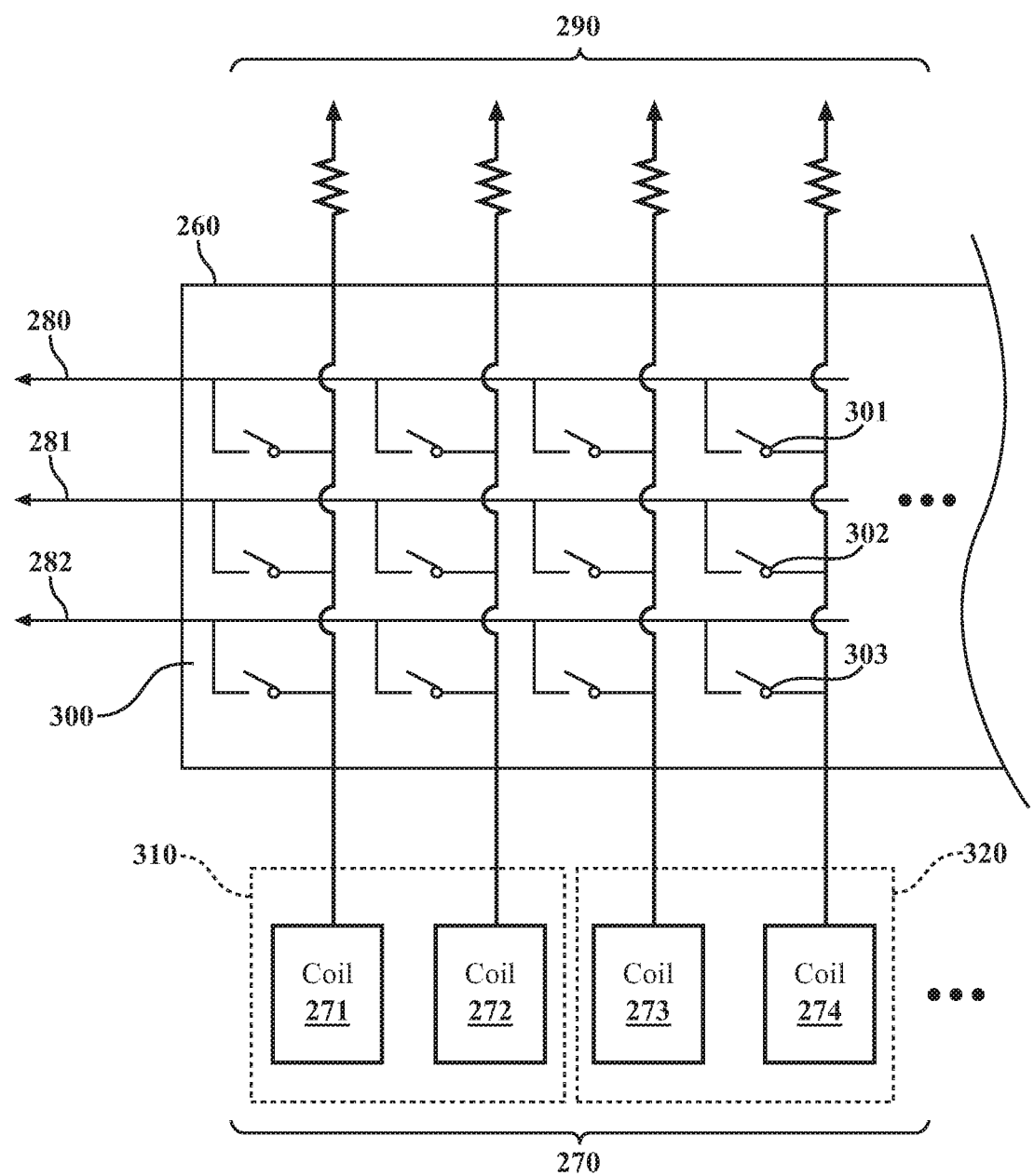
FIG. 3 illustrates a switch network according to the disclosed embodiments.

FIG. 3 shows an example configuration of a section of a switch network 260 of a wireless power transfer system 170 according to the disclosed embodiments. For illustrative purposes the switch network 260 is shown with limited components, e.g., connected to only four receiver coils 271-274. It should be understood, however, that an implementation of the disclosed subject matter can include greater or fewer receiver coils 270, switches 300 and other associated components.

The switch network 260 includes a plurality of switches 300, e.g., switches 301-303, that can connect or disconnect individual receiver coils 271-274 to output lines 280-282. The output lines 280-282 can travel from the switch network 260 to various sections of the vehicle 100 to serve as potential electrical connections to components/subsystems of the vehicle 100 that may require power. For example, in one implementation, output line 280 may travel from the switch network 260 to a rear section of the vehicle 100 to function as an electrical connection to a rearview camera (not shown). Similarly, output line 281 may travel to a front section of the vehicle 100 to function as a connection to a bumper proximity sensor (not shown).

The layout of the switch network 260 can be adjusted according to the requirements of implementation. For example, although the switch network 260 is shown as including a switch connecting each individual receiver coil 271-274 to each individual output line 280-282, in one or more embodiments individual coils may be connected to less than the full number of output lines.

In addition to being connected to the switches 300, the receiver coils 270 may be connected to power readout lines 290. In one or more embodiments, each individual receiver coil 271-274 can be connected to a respective individual power readout line. The monitoring module 220 can be configured to monitor the power readout lines 290 to determine a power output level of each individual receiver coil and store the power readouts 240 in the database 119.

In one or more embodiments, the controller module 230 is configured to control the opening and closing of the switches 300. The controller module 230 can analyze the power readouts 240 to identify which of the receiver coils 270 are currently outputting power and at what level. The controller module 230 can be configured to create one or more sets of coils 270 to meet the power requirements of specific electrical components of the vehicle 100. For example, an electrical component, such as a rearview camera (not shown) drawing power from output line 281, may require more power than a single coil can generate, even in optimal transfer conditions. To power the component, the controller module 230 can create a set of coils, e.g., set 320, that, in combination, generates enough power to drive the rearview camera.

To create a set, the controller module 230 can determine a threshold amount of power required for the electrical component (e.g., via a lookup table) and analyze the power readouts 240 to determine how many and/or which receiver coils 270 should be combined to drive the electrical component. In one or more embodiments, the controller module 230 can analyze the power readouts 240 to determine a least number of receiver coils necessary to drive the load. For example, the controller module 230 can determine that two receiver coils 271-272 generate enough power to drive the rearview camera of the vehicle. The control module 230 can therefore create a set 310 to drive the rearview camera by closing the specific switches among the switches 300 that connect coils 271-272 to an output line that provides a connection to the rearview camera, e.g., output line 280.

The output line can be directly connected to the target electrical component, but need not be directly connected in every case. In one or more embodiments the output lines 280-282 can function as internal power lines switchably connected to one or more target electrical components.

Continuing the above scenario, the controller module 230 can determine a threshold amount of power required for a second electrical component of the vehicle 100 and analyze the power readouts 240 to determine how many and/or which receiver coils 270 should be combined to drive the second electrical component. For example, the controller module 230 can determine that two coils 273-274 generate enough power to drive a proximity sensor (not shown) of the vehicle 100, which draws power from a connection to output line 281. The controller module 230 can create a set second 320 to drive the proximity sensor by closing the specific switches among the switches 300 that connect coils 273-274 to the output line 281.

If a currently inactive electrical component is activated in the vehicle 100 and requires power, the controller module 230 can respond by adjusting the switch network 260 to transmit power to the newly activated electrical component. For example, the controller module 230 can connect unused receiver coils from among the receiver coils 270 to the newly activated component, or repurpose receiver coils that are connected to other electrical components which are currently not being used. For example, consider a situation in which a first set of receiver coils and a second set of receiver coils are respectively connected to electrical components which have gone inactive and are no longer drawing power. The controller module 230 can receive a signal indicating an activation request for a different electrical component (e.g., rear seat infotainment screen) of the vehicle 100 and, in response, change the switch network 260 to form a connection between the newly activated electrical component and one or more receiver coils selected from the first set of coils 310 and/or the second set of coils 320.

The dynamic nature of creation/adjustment of sets and connections allows the disclosed wireless power transfer system 170 to respond quickly to multiple events, such as receiver coil malfunction, new component activations, or loss of power due to shifts in lateral position of the vehicle 100 with respect to the transmission coils.

Figure 4:
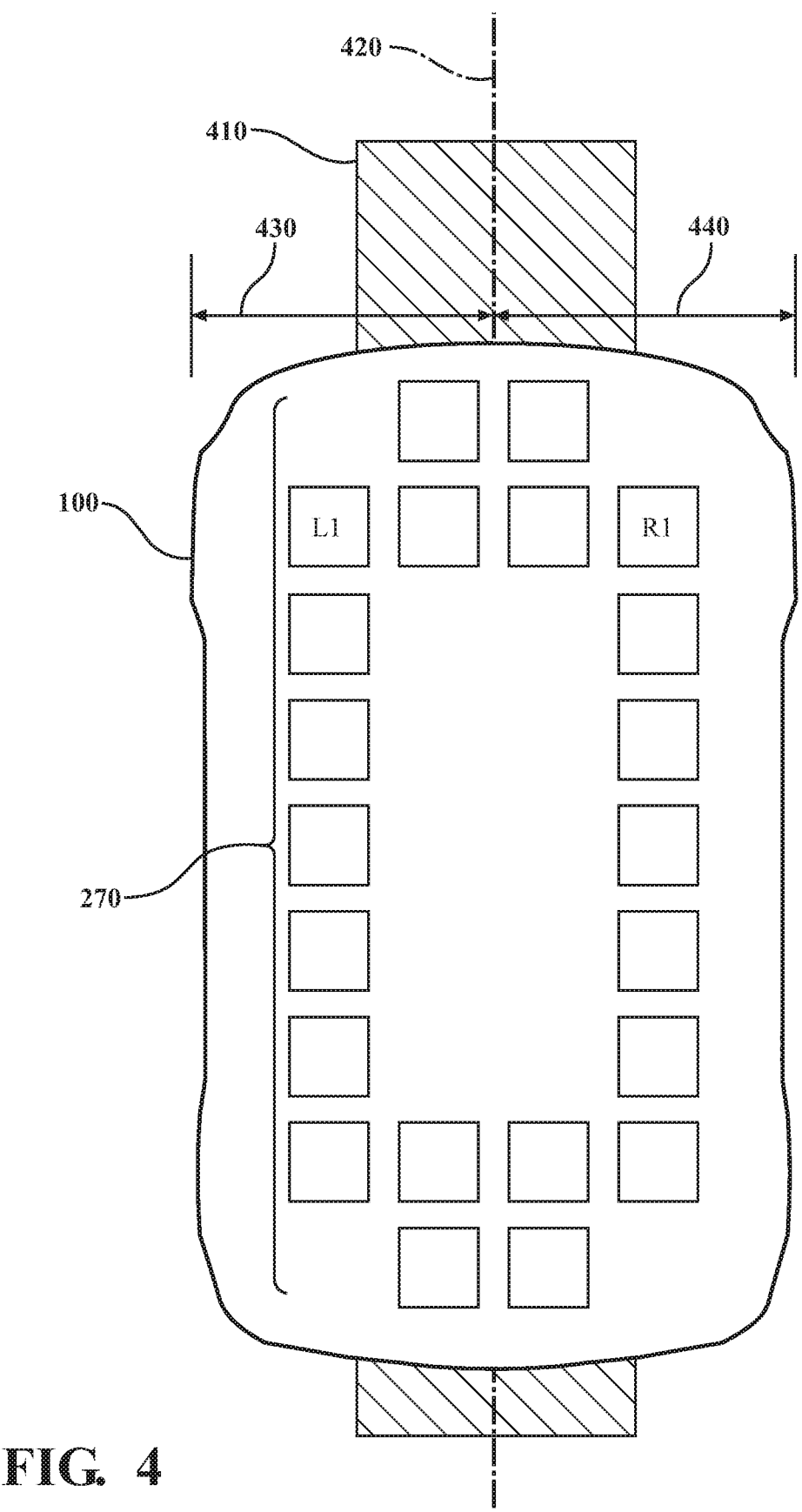
FIG. 4 illustrates an example scenario of a vehicle traveling over a power transmission device according to the disclosed embodiments.

FIG. 4 shows an example situation of a vehicle 100 driving over a power transmission device, e.g., a power section 410 of a road, garage, a parking space, etc. The power section 410 can be implemented, for example, by embedding a series of induction coils on or within the road, concrete, ground, etc. The vehicle 100 includes a plurality of receiver coils 270. In one or more embodiments, the receiver coils 270 are arranged in circular pattern on the underside of the vehicle 100 leaving a space for a main, central coil (not shown). However, the receiver coils 270 can be configured in different layouts, such as a full grid layout or another layout. That is, in one or more embodiments, the receiver coils 270 can supplement a main central coil (not shown) that charges a primary battery (not shown) of the vehicle 100, while in one or more other embodiments, the receiver coils 270 can completely replace a central coil or other conventional coil system.

In one or more embodiments the disclosed receiver coils 270 can include a receiver coil L1 installed near a left side of the vehicle 100 and a receiver coil R1 installed near a right side of the vehicle 100. In one or more embodiments the controller module 230 can compare a power readout 240 of receiver coil L1 with a power readout of a receiver coil R1 and determine an estimated alignment position of the vehicle over the power section 410 based on the comparison. Based on the estimated alignment position and the power readouts 240 from L1, the controller module 230 can determine an estimated left lateral displacement 430 of the vehicle 100 from a center 420 of the power section 410 at the time of the readout. Likewise, based on the power readouts 240 from R1, the controller module 230 can determine an estimated right lateral displacement 440 of the vehicle 100 from the center 420 of the power section 410 at the time of the readout. The controller module 230 can store the displacements 430, 440 as lateral position information 250 in the database 119. In one or more embodiments, the controller module 230 can determine an optimal lateral displacement for execution of wireless power transfer for the vehicle 100 based at least in part on the power readouts 240 and the lateral position information 250.

The optimal lateral displacement for wireless power transfer may depend on multiple factors, such as the layout configuration of the receiver coils 270, characteristics of the power section 410, and the current operational status of the receiver coils 270. For example, in the circular layout configuration shown in FIG. 4, with all receiver coils 270 functioning properly, equidistance lateral displacements 430, 440 may achieve an optimal wireless power transfer for the system 170. However, the optimal lateral displacements may change, e.g., due to wear and tear over time or due to variance in the transmission coils from place to place. For example, if several receiver coils 270 on the left side of the vehicle 100 malfunction, e.g., due to being repeatedly struck by debris, the optimal lateral displacements for maximizing efficiency of the wireless power transfer system 170 as a whole may shift toward the left, as shown in FIG. 5, thereby placing more of functioning right-side receiver coils over the power section 410.

Figure 5:
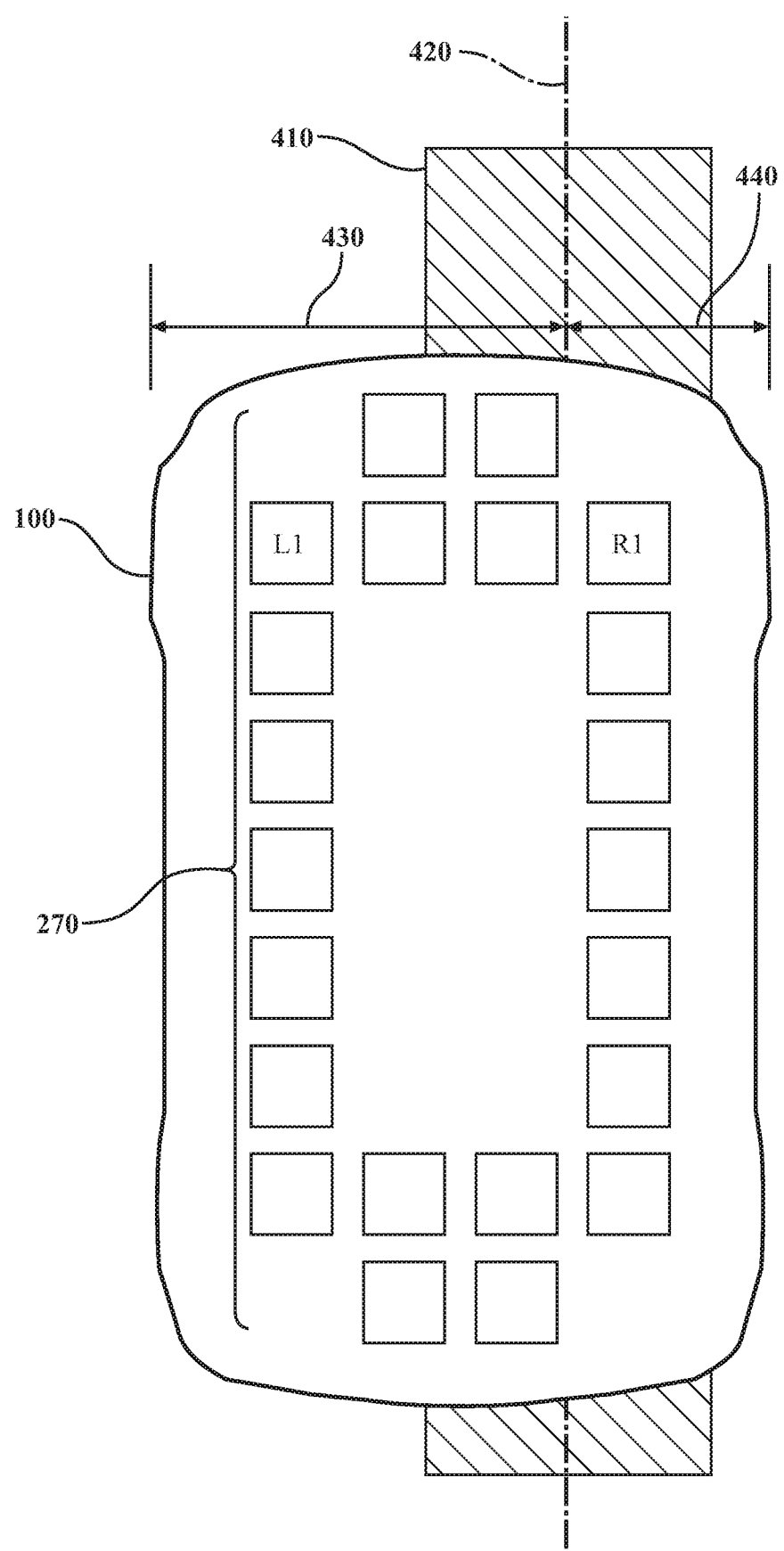
FIG. 5 illustrates another example scenario of a vehicle traveling over a power transmission device according to the disclosed embodiments.

In another example, due to malfunctioning of the transmission coils in the power section 410 of a given location, the optimal lateral displacements 430, 440 may be shifted to one side or the other at that given location (e.g., as shown in FIG. 5). The monitoring module 220 can store location information in association with the power readouts 240. Based on historical power readouts 240 over time, the controller module 230 can further adjust the determinations of optimal lateral displacements 430, 440 per location (e.g., per street, per parking space, etc.).

The controller module 230 can therefore determine an optimal alignment of the vehicle 100 over the power section 410. When the vehicle 100 is in an autonomous mode, the controller module 230 can transmit information indicating the optimal alignment to a steering system 143 (FIG. 1) of the vehicle 100 to guide the vehicle 100 to be maneuvered as close to the optimal alignment as possible. For example, as the vehicle 100 is traveling over the power section 410 or attempting to park over the power section 410, the controller module 230 can determine a steering adjustment for the vehicle 100 based on the optimal lateral position and a current lateral position of vehicle 100 relative to the power transmission device.

When the vehicle 100 is in a manual mode the controller module 230 can transmit information indicating the optimal alignment to an output system 135 (FIG. 1) of the vehicle 100, such as a dashboard screen, other display, audio device, haptic device, etc. The output system 135 can convey guidance information to the driver indicating when the vehicle 100 is not in an optimal alignment, such as an arrow, a voice instruction, a vibration on the left or right side of the steering wheel, etc., provided to inform the driver of which direction to shift toward in order to achieve optimal alignment for wireless power transfer.

Figure 6:
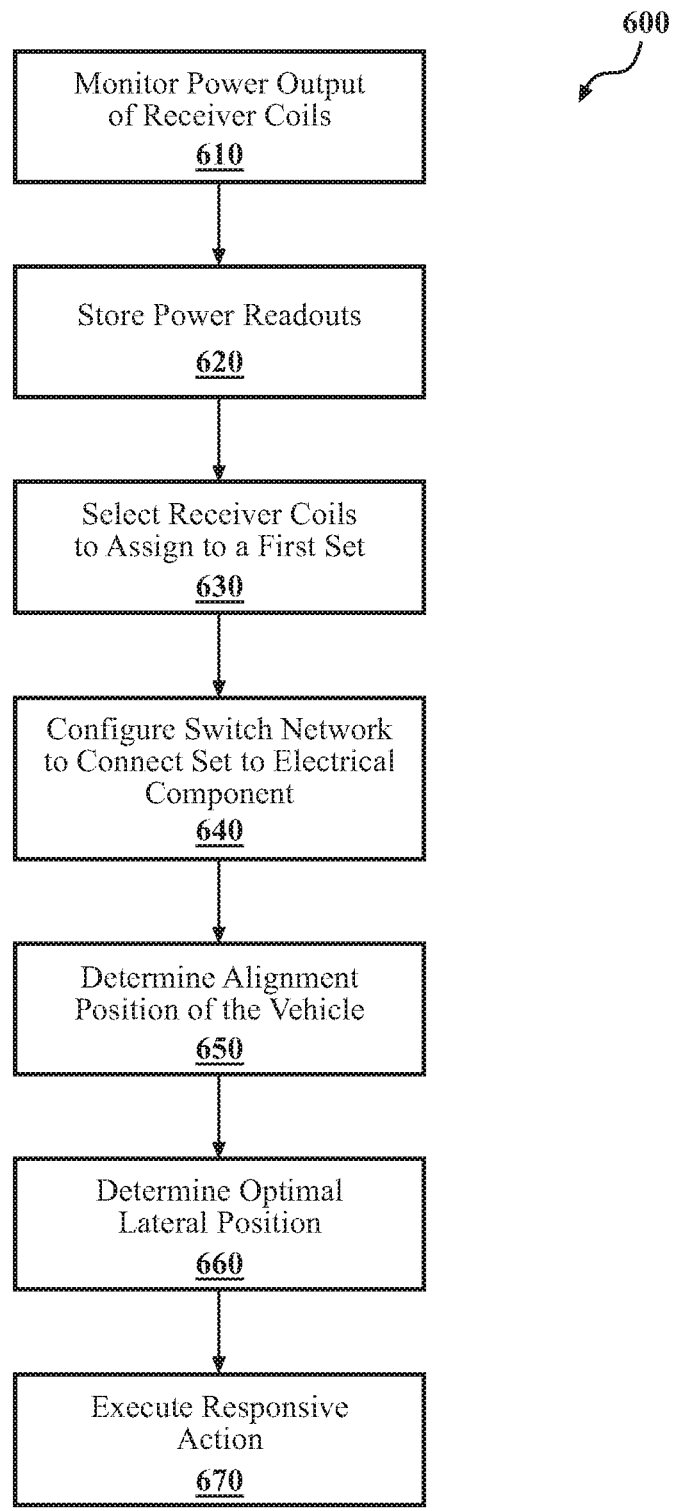
FIG. 6 illustrates a flow chart of a method of wirelessly transferring power according to the disclosed embodiments.

FIG. 6 illustrates a flowchart of a method 600 of controlling and optimizing wireless power transfer according to the disclosed embodiments. Method 600 will be discussed from the perspective of the wireless power transfer system 170 of FIGS. 1 and 2. While method 600 is discussed in combination with the wireless power transfer system 170, it should be appreciated that the method 600 is also not limited to being implemented within the wireless power transfer system 170 but is instead one example of a system that may implement the method 600.

At operation 610, the wireless power transfer system 170, e.g., the monitoring module 220, monitors a power output of the receiver coils 270. At operation 620 the monitoring module 220 stores power readouts 240 for each of the receiver coils 270 in the database 119. In one or more embodiments the power readouts 240 can be stored on a periodic basis, e.g., once every minute, once every fifteen minutes, once every hour, or a different time interval. In one or more embodiments, the power readouts 240 can be stored in association with location information indicating where the power readout 240 occurred.

At operation 630, the wireless power transfer system 170, e.g., controller module 230, selects, based on the power readings, a set of one or more receiver coils among the receiver coils 270. In one or more embodiments the controller module 230 can select which receiver coils to assign to the set based, for example, on an activation request (or a default setting) from a target electrical component, how much power the target electrical component requires to operate, and how much power each individual receiver coil is generating. For example, in one implementation the controller module 230 can select three individual receiver coils that generate, in sum total, enough power to drive a rearview camera of the vehicle 100 and assign the three receiver coils to a set that will drive the rearview camera.

The controller module 230 can select multiple sets of receiver coils from among the receiver coils 270 to drive multiple loads, such as electrical components of the vehicle 100, recharging electrical component batteries, recharging a primary battery of the vehicle 100, or the like. Furthermore, the controller module 230 can adjust the selection (i.e., constitution) of a given set based on the power readouts 240. For example, if the power readouts 240 indicate a loss of power generation of an individual receiver coil in a given set (e.g., due to malfunction, a shift in alignment of the vehicle 100 with respect to a power generation device, etc.), the controller module 230 can dynamically select a replacement receiver coil. Furthermore, the controller module 230 can reassign receiver coils to different sets as new power tasks arise and former power tasks are completed. For example, the controller module 230 can receive a signal indicating an activation request for an electrical component and, in response, change the switch network 260 to reassign a receiver coil to a new set from an existing set that was driving an electrical component which is no longer drawing power.

At operation 640, the controller module 230 configures the switch network 260 to form a connection between the first set of receiver coils and the target electrical component. For example, the controller module 230 can close switches in the switch network 260 that complete connections between each receiver coil in the first set and an output line 280 of the switch network 260 that is connected to the target electrical component to deliver power to the target electrical component.

At operation 650, the controller module 230 compares a power readout 240 of a first coil of the receiver coils 270 (e.g., located on a first side of the vehicle 100, for example, left side) with a power readout 240 of a second coil of the receiver coils 270 (e.g., located on a second side of the vehicle 100 opposite to the first side, for example, right side) and determines an alignment position of the vehicle 100 over a power transmission device based on the comparison.

At operation 660, the controller module 230 determines an optimal lateral position for power transfer for the vehicle 100 based at least in part on the alignment position. In one or more embodiments, the optimal lateral position for the vehicle 100 is relative to the power transmission device and can be an optimal position for: 1) capturing a greatest amount of power collectively for all receiver coils 270; 2) capturing a greatest amount of power for all receiver coils 270 currently assigned to any set for powering an electrical component; 3) capturing a greatest amount of power for a main receiver coil separate from the receiver coils 270; or 4) capturing a greatest amount of power for other designated receiver coils 270.

At operation 670, the controller module 230 executes a responsive action based at least in part on the optimal lateral position. For example, when the vehicle 100 is operating in an autonomous mode, the controller module 230 can determine a steering adjustment for the vehicle 100 based on the optimal lateral position and the current lateral position of vehicle 100 relative to the power transmission device and transmit the steering adjustment to the steering system 143 to steer the vehicle 100 toward the optimal lateral position.

In another example, when the vehicle 100 is operating in a manual mode, the controller module 230 can communicate guidance for achieving the optimal lateral position to a driver of the vehicle 100. For example, the guidance can be communicated to the driver by displaying guidance indications (e.g., arrows) on a display screen visible to the driver, providing audible cues to the driver (e.g., "for better power capture, shift slightly left in the lane"), providing haptic cues (e.g., vibrations on the left or right side of a steering wheel), or using other forms of communication.

Accordingly, the disclosed wireless power transfer system 170 can improve the operation of a vehicle 100, whether in an autonomous or manual operation mode, by enhancing wireless power transfer efficiency in multiple different ways. For example, the inclusion of a plurality of independent, distributed receiver coils 270 increases the potential coupling area of the system 170 and increases responsive versatility by allowing assignment and reassignment of individual coils 270 to sets that power different electrical components of the vehicle 100 as needed. If an individual receiver coil malfunctions, another can be assigned to replace it. Furthermore, the disclosed system 170 can provide guidance on positioning the vehicle 100 with respect to a power transmission device to achieve optimal wireless power transfer for different conditions.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can implement the database 119 (FIG. 2) and can further include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the wireless power transfer system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the wireless power transfer system 170, and/or the autonomous driving module(s) 160 may control some or all of these vehicle systems 140 and, thus, may be partially or fully autonomous.

The processor(s) 110, the wireless power transfer system 170, and/or the autonomous driving module(s) 160 can be operatively connected to communicate with the various vehicle systems 140 and/or individual components thereof. For example, returning to FIG. 1, the processor(s) 110, the wireless power transfer system 170, and/or the autonomous driving module(s) 160 can be in communication to send and/or receive information from the various vehicle systems 140 to control the movement, speed, maneuvering, heading, direction, etc. of the vehicle 100. The processor(s) 110, the wireless power transfer system 170, and/or the autonomous driving module(s) 160 may control some or all of these vehicle systems 140.

The processor(s) 110, the wireless power transfer system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the wireless power transfer system 170, and/or the autonomous driving module(s) 160 can control the direction and/or speed of the vehicle 100, e.g., to move toward an optimal alignment position. The processor(s) 110, the wireless power transfer system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the wireless power transfer system 170 can be configured to determine travel path(s) and determine current autonomous driving maneuvers for the vehicle 100, future autonomous driving maneuvers and/or modifications to current autonomous driving maneuvers based on data acquired by the sensor system 120 and/or wireless power transfer system 170, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A vehicle including a wireless power transfer system, comprising:
   a switch network configured to deliver power to one or more electrical components of the vehicle;
   a plurality of receiver coils, distributed on an underside of the vehicle, configured to receive power wirelessly, and connected to the switch network;
   one or more processors; and
   a memory communicably coupled to the one or more processors and storing:
      a monitoring module including instructions that when executed by the one or more processors cause the one or more processors to:
         monitor the plurality of receiver coils and output power readouts for each coil of the plurality of receiver coils; and
         store, as historical power readouts, the output power readouts;
         store, for an output power readout, of the historical power readouts, information about a location of the vehicle associated with the output power readout; and
      a controller module including instructions that when executed by the one or more processors cause the one or more processors to:
         determine, based on a current output power readout, an alignment position of the vehicle over a power transmission device;
         determine, based on the alignment position, the location of the vehicle, and the output power readout, of the historical power readouts, associated with the location of the vehicle, an optimal lateral displacement for the vehicle relative to the power transmission device, the optimal lateral displacement being a displacement, from a centerline with respect to a length of the power transmission device, of at least one of a left side of the vehicle or a right side of the vehicle;
         select, based on the output power readouts, a first set of receiver coils of the plurality of receiver coils;
         form a connection, via the switch network, between the first set of receiver coils and a first electrical component of the vehicle to power the first electrical component;
         select a second set of receiver coils, of the plurality of receiver coils, the second set being different from the first set; and
         form a connection, via the switch network, between the second set of receiver coils and a second electrical component of the vehicle of the vehicle to power the second electrical component.

2. The vehicle of claim 1, wherein the controller module further includes instructions to change a selection of the receiver coils that form the first set of receiver coils when the output power readouts indicate an individual receiver coil in the first set of receiver coils is not producing power.

3. The vehicle of claim 1, wherein the controller module further includes instructions to:
   receive a signal indicating an activation request for a third electrical component of the vehicle; and
   change the switch network to form a connection between the third electrical component and at least one receiver coil selected from either the first set of receiver coils or the second set of receiver coils.

4. The vehicle of claim 1, wherein the controller module further includes instructions to:
   compare an output power readout of a first coil, of the plurality of receiver coils, with an output power readout of a second coil of the plurality of receiver coils; and
   determine the alignment position of the vehicle over the power transmission device based on a result of a comparison of the output power readout of the first coil with the output power readout of the second coil.

5. The vehicle of claim 4, wherein the controller module further includes instructions to determine a steering adjustment for the vehicle based on the optimal lateral displacement and a current lateral position of vehicle relative to the power transmission device.

6. The vehicle of claim 4, wherein the controller module further includes instructions to communicate guidance for achieving the optimal lateral displacement to a driver of the vehicle.

7. A method of wirelessly transferring power to a vehicle, comprising:
   monitoring a power output of a plurality of receiver coils installed on the vehicle;
   storing, as historical power readouts, power readouts for each coil of the plurality of receiver coils;
   storing, for a power readout, of the historical power readouts, information about a location of the vehicle associated with the power readout;
   determining, based on a current power readout, an alignment position of the vehicle over a power transmission device;
   determining, based on the alignment position, the location of the vehicle, and the power readout, of the historical power readouts, associated with the location of the vehicle, an optimal lateral displacement for the vehicle relative to the power transmission device, the optimal lateral displacement being a displacement, from a centerline with respect to a length of the power transmission device, of at least one of a left side of the vehicle or a right side of the vehicle;
   selecting, based on the power readouts, a first set of receiver coils of the plurality of receiver coils;
   forming a connection, via a switch network, between the first set of receiver coils and a first electrical component of the vehicle to power the first electrical component;
   selecting a second set of receiver coils, of the plurality of receiver coils, the second set being different from the first set; and
   forming a connection, via the switch network, between the second set of receiver coils and a second electrical component of the vehicle to power the second electrical component.

8. The method of claim 7, further comprising changing a selection of the receiver coils that form the first set of receiver coils when the power readouts indicate an individual receiver coil in the first set of receiver coils is not producing power.

9. The method of claim 7, further comprising:
   receiving a signal indicating an activation request for a third electrical component of the vehicle; and
   changing the switch network to form a connection between the third electrical component and at least one receiver coil selected from either the first set of receiver coils or the second set of receiver coils.

10. The method of claim 7, further comprising:
comparing a power reading of a first coil, of the plurality of receiver coils, with a power reading of a second coil of the plurality of receiver coils; and
determining the alignment position of the vehicle over the power transmission device based on a result of a comparison of the power reading of the first coil with the power reading of the second coil.

11. The method of claim 10, further comprising determining a steering adjustment for the vehicle based on the optimal lateral displacement and a current lateral position of vehicle relative to the power transmission device.

12. The method of claim 10, further comprising communicating guidance for achieving the optimal lateral displacement to a driver of the vehicle.

13. The method of claim 7, wherein the selecting the first set of receiver coils comprises selecting the first set of receiver coils to meet a power requirement of the first electrical component.

14. The method of claim 7, further comprising:
determining a threshold amount of power required for the first electrical component; and
analyzing the power readouts to determine at least one of how many of the plurality of receiver coils or which of the plurality of receiver coils to select to form the first set of receiver coils to drive the electrical component.

15. The method of claim 7, further comprising:
dynamically adjusting the switch network to reroute power from a redundant receiver coil, of the plurality of receiver coils, to replace power loss from a malfunctioning receiver coil of the first set of receiver coils.

16. A non-transitory computer-readable medium for wirelessly transferring power to a vehicle, including instructions that, when executed by one or more processors, cause the one or more processors to:
monitor a power output of a plurality of receiver coils installed on the vehicle;
store, as historical power readouts, power readouts for each coil of the plurality of receiver coils;
store, for a power readout, of the historical power readouts, information about a location of the vehicle associated with the power readout;
determine, based on a current power readout, an alignment position of the vehicle over a power transmission device;
determine, based on the alignment position, the location of the vehicle, and the power readout, of the historical power readouts, associated with the location of the vehicle, an optimal lateral displacement for the vehicle relative to the power transmission device, the optimal lateral displacement being a displacement, from a centerline with respect to a length of the power transmission device, of at least one of a left side of the vehicle or a right side of the vehicle;
select, based on the power readouts, a first set of receiver coils of the plurality of receiver coils;
form a connection, via a switch network, between the first set of receiver coils and a first electrical component of the vehicle to power the first electrical component;
select a second set of receiver coils, of the plurality of receiver coils, the second set being different from the first set; and
form a connection, via the switch network, between the second set of receiver coils and a second electrical component of the vehicle to power the second electrical component.

17. The non-transitory computer-readable medium of claim 16, further comprising instructions to change a selection of the receiver coils that form the first set of receiver coils when the power readouts indicate an individual receiver coil in the first set of receiver coils is not producing power.

18. The non-transitory computer-readable of claim 16, further comprising instructions to:
receive a signal indicating an activation request for a third electrical component of the vehicle; and
change the switch network to form a connection between the third electrical component and at least one receiver coil selected from either the first set of receiver coils or the second set of receiver coils.

19. The non-transitory computer-readable of claim 16, further comprising instructions to:
compare a power reading of a first coil, of the plurality of receiver coils, with a power reading of a second coil of the plurality of receiver coils; and
determine the alignment position of the vehicle over the power transmission device based on a result of a comparison of the power reading of the first coil with the power reading of the second coil.

20. The non-transitory computer-readable of claim 7, further comprising instructions to determine a steering adjustment for the vehicle based on the optimal lateral displacement and a current lateral position of vehicle relative to the power transmission device.

* * * * *